United States Patent

[11] 3,590,584

[72] Inventors Hugh J. Fitzgerald
  Austin;
  Ernest H. Koepf, Dallas, both of, Tex.
[21] Appl. No. 882,638
[22] Filed Dec. 5, 1969
[45] Patented July 6, 1971
[73] Assignee Ocean Pollution Control, Inc.
  Dallas, Tex.

[54] FLOATING OIL CONFINING APPARATUS
  10 Claims, 3 Drawing Figs.
[52] U.S. Cl. .................................................. 61/1,
  61/5, 210/242
[51] Int. Cl. ........................................... B01d 21/02,
  E02b 15/04
[50] Field of Search .......................................... 61/1, 5;
  210/242

[56] References Cited
  UNITED STATES PATENTS
3,476,246  11/1969  Dahan ........................ 61/1

3,503,214  3/1970  Desty et al. ...................  61/1
  FOREIGN PATENTS
1,528,855  1968  France ........................  61/1

Primary Examiner—Jacob Shapiro
Attorney—Richards, Harris & Hubbard

ABSTRACT: Apparatus for collecting oil from the surface of a body of water having two V-shaped assemblies of flexible inflated floats, one arranged 5 to 25 feet leewardly of the other on the same central axis, whereby the wind and current drive the oil into the open end of the assemblies and cause it to be funneled rearwardly to their apices. Each V-shaped assembly is provided with a depending skirt of impermeable sheet material, the lower edges of the skirts at either side of the inner assembly being interconnected by shock cords and the lower edges of the skirts on the outer assembly being connected to the inner assembly by netting.

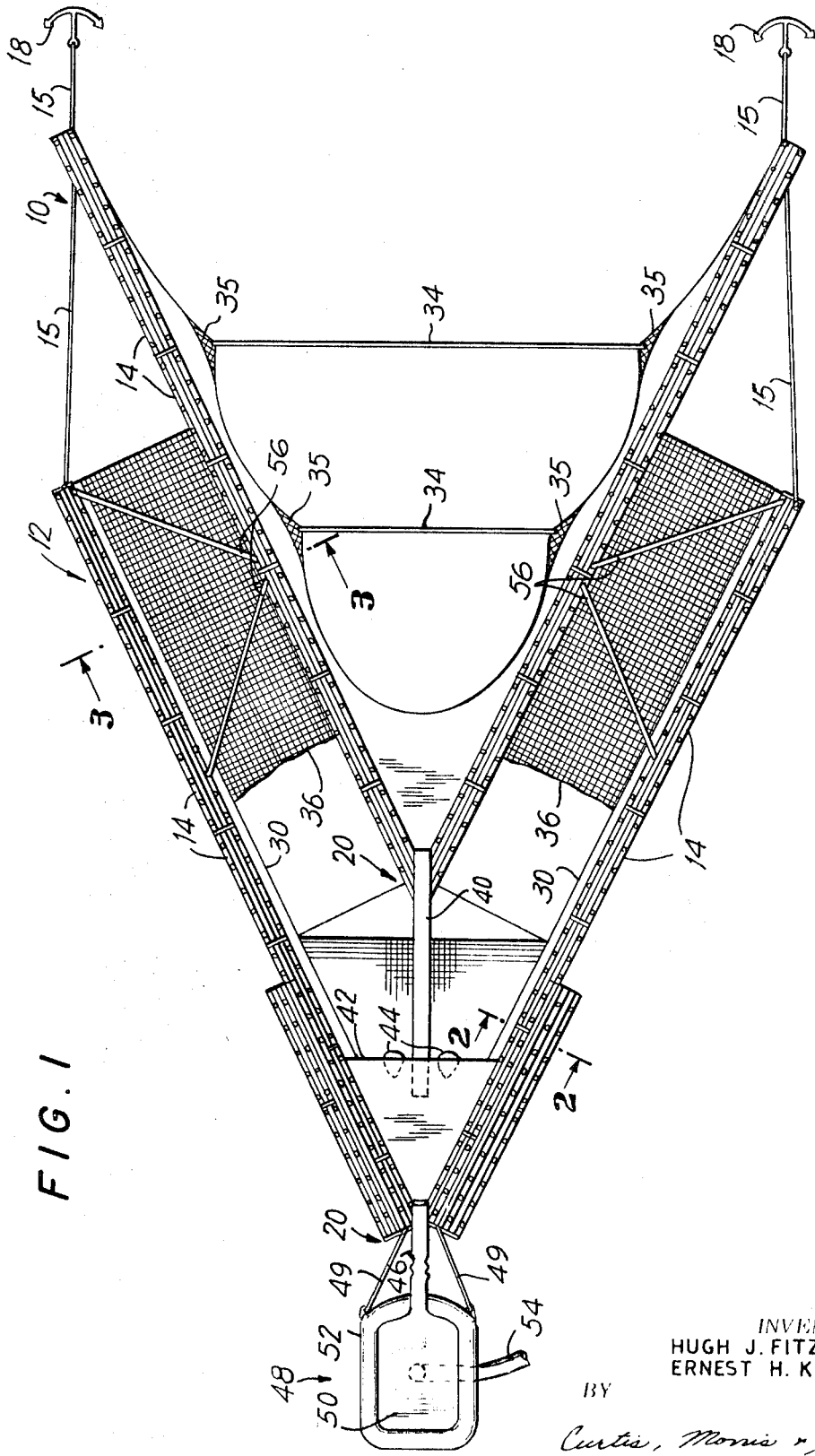

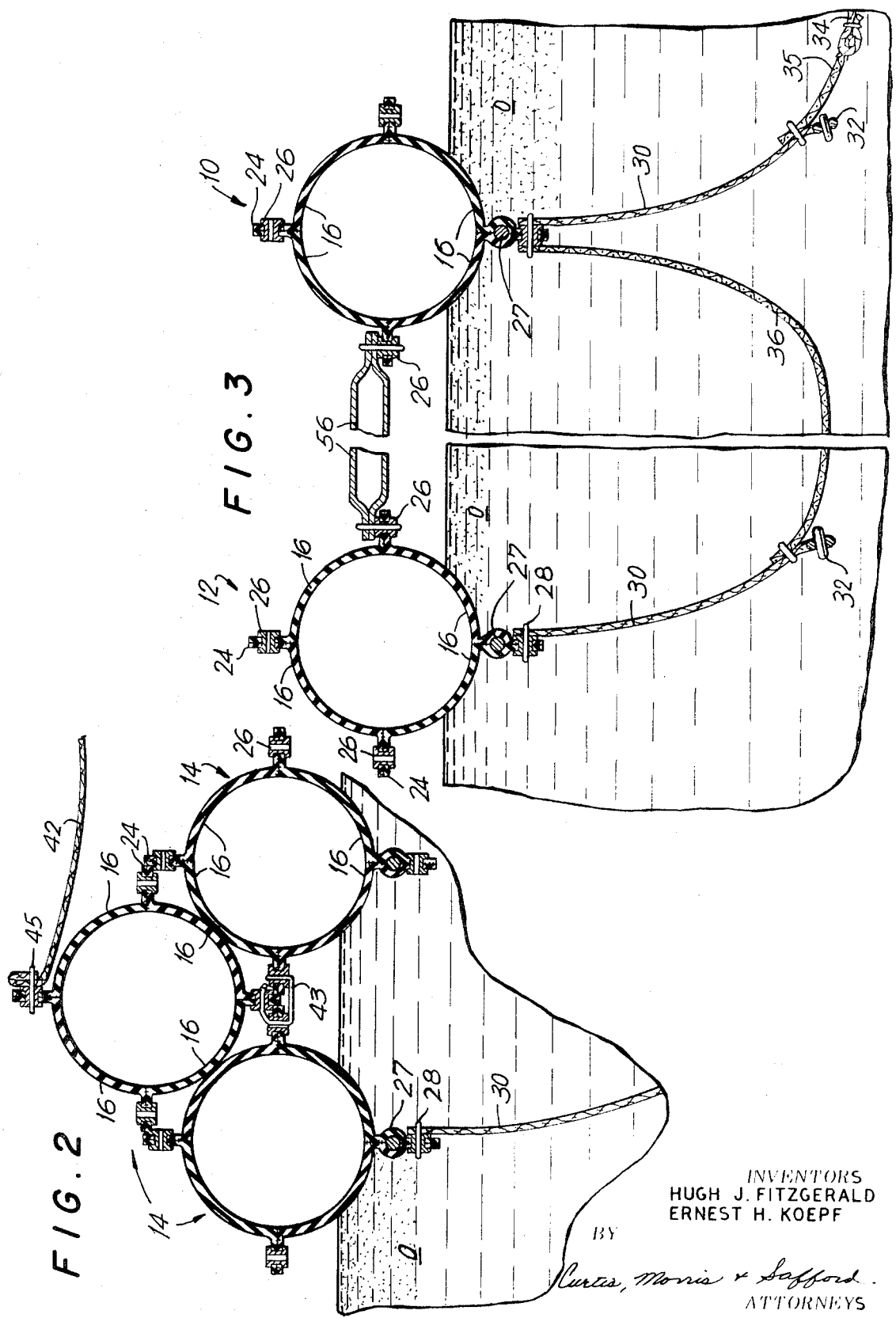

FLOATING OIL CONFINING APPARATUS

This invention relates to apparatus for confining an oily material on the surface of a body of water and removing the resulting accumulation.

It is well known that when oil is released in or on a large body of water, because of the immiscibility of oil with water and the fact that oil is lighter than water, the oil rises to the surface of the water in the form of a film or slick which spreads to cover a large area and which is capable of migrating considerable distances depending upon the wind and the current. Where large quantities of oil are released, for example due to the sinking or damage of an oil tanker or to escape of oil under pressure through a fissure in an otherwise impermeable formation overlying an oil reservoir or in connection with an offshore drilling operation, movement of the oil slick to adjacent coastal areas can not only form an unsightly and messy residue on beaches, interfering with their recreational uses, but also have serious effects on aquatic birds, fish and other marine life, as well as other adverse ecological consequences.

Until recently there has been no effective means for confining and/or removing large oil films from open bodies of water. Attempts to use detergents and other chemicals to emulsify and/or disperse the oil have for the most part proven ineffective. On the other hand, attempts to use detergents and other chemicals to emulsify and/or disperse the oil have for the most part proven ineffective. On the other hand, attempts to confine the oil to a limited area to prevent its dispersion, for example by a chain of logs or elongated floats connected end to end in a circle, or to skim the oil from the surface by towing means such as a chain of floats between a pair of tugboats moving on parallel courses, have proved virtually worthless due to the fact that the surface of an ocean, bay or large inland lake is almost invariably subject to waves or choppiness which causes the oil film to be washed over the tops of the rigid floats so that most of the oil escapes.

In the copending application Ser. No. 836,545 filed June 25, 1969, there is disclosed an apparatus for confining an oily material to a limited area of the surface of the water, thereby preventing its spreading or migration, and for removing the resulting accumulation. In one illustrative form, that apparatus comprised a series of elongated flexible, hollow, tubular float members, which were inflated to low pressure, on the order of 0.5 p.s.i., to maintain a high degree of flexibility, and which were connected end to end in a ring which surrounded an area of substantial width around the source of the oily material. Depending from the float members were skirts of impermeable sheet material weighted at the lower ends, for example by a chain, and extending downwardly a distance exceeding the anticipated maximum thickness of the oily accumulation. The ring was generally rhomboidal in shape, with each corner on the windward side connected to an anchor means to keep the ring spread and to prevent its drifting due to wind and current. The flexibility of the ring allowed it to conform to the wave motion and chop of the surface and thus tended to prevent escape of the oily accumulation either over the tops of the float members or under the bottom of the skirt. A transfer pipe was supported within the ring, preferably at the leeward corner, with the inlet end of the pipe at a level within the thickness of the oily accumulation. The pipe extended to a pump, for example on a storage barge anchored adjacent but outside the ring, to remove the oily material as it accumulated.

Tests of that apparatus indicated that it did a highly creditable job of confining the oil under most surface conditions, substantially better than any previously known device. However, in heavy seas or extreme choppiness, a portion of the oil inevitably washed over the tops of the float members and escaped. However, a most interesting phenomenon was observed: Although the barrier extends for only a few feet and above and below the surface, it unexpectedly produced a marked effect in calming the surface motion, creating an area of "dead water" on the leeward side of the barrier. Thus it was assumed that a second, similar barrier on the leeward side of the first, within this "dead water " area, might perform much more efficiently than the first barrier and capture substantially all of any oil escaping from the first. Tests fully confirmed this assumption.

The present invention exploits this phenomenon by providing two generally V-shaped float assemblies, each formed of a series of inflated, tubular float members connected end to end, with one assembly positioned a short distance behind the other along the same central axis, with anchor means to hold the divergent ends of the assemblies in position to windward, with their apices trailing leewardly so that the oil is driven into the open end of the assemblies and funneled toward their apices. At least the outer one of the two assemblies is provided with a depending skirt which extends several feet below the surface with its lower end preferably connected to the inner assembly by tie means, such as netting, to prevent the skirt from streaming leewardly and allowing the oil to escape beneath it. The apex of the outer assembly is connected to a sump which trails rearwardly thereof and in which the oil is collected for removal, for example through a flexible line connected to a pump on a nearby barge.

In the drawings:

FIG. 1 is a diagrammatic plan view of an illustrative apparatus embodying features of the invention.

FIG. 2 and 3 are enlarged fragmentary sectional views taken respectively on the lines 2-2 and 3-3 of FIG. 1.

As best shown in FIG. 1, the illustrative apparatus comprises two generally similar V-shaped float assemblies 10 and 12, each formed of a series of inflated, elongated, tubular float members 14 connected end to end. The two float assemblies are spaced a short distance apart along a common central axis, with the divergent ends of the two assemblies secured by lines 15 to anchor means, for example anchors 18 or other moorings, such as pilings or slow-moving tugboats, etc., which keep the open ends of the two assemblies facing to windward with their apices 20 trailing leewardly.

As may be seen in FIGS. 2 and 3, each of the float members 14 may be formed of four quadrantial segments 16, each of which extends lengthwise of the elongated tubular member around one-quarter of its circumference. The segments are formed of flexible, impermeable sheet material, such as nylon fabric or other strong textile material, impregnated with or laminated to neoprene, rubber or similar flexible plastic material. The proximate ends of the adjacent segments are adjoined by marginal portions which are bonded face to face, for example by cementing, heat sealing or vulcanization, to form radially outwardly extending flanges 24. These flanges 24 are provided with holes—preferably reinforced, for example by grommets 26—for convenience in attaching the float members to one another and to ancillary parts of the apparatus. The upper flanges 24 increase the effective height of the barrier.

The lower flange 24 preferably encloses an integral cable or rope 27 formed, for example of nylon or similar material, which is provided at each end with a projecting loop or other means of attaching the float members together and for transmitting the tensile forces, imposed either by wave action or by towing to or from the point of use, without straining and possibly tearing the float members.

Attached to the bottom edge of the lower flange 24, for example by lacing a line 28 through their aligned grommets 26, is a depending skirt 30 which is formed of a flexible, impermeable sheet material, for example the same type of material used in fabricating the float members, although possibly of lighter gauge. Secured adjacent the lower edge of the skirt 30 is a chain 32 which weights the edge of the skirt to insure that it extends downwardly into the water, without impairing its flexibility. The width of the skirt exceeds the anticipated maximum thickness of the oily accumulation to prevent the oily material from escaping beneath the bottom edge of the skirt. The skirt 30 may suitably be made integral with the float member 10, for example by merely extending the marginal portion of one of the lower segments 16. However, forming it of a separate sheet, removably attached to the float member, as shown, allows it to be replaced readily in the event of damage, or in the event a deeper skirt is desired, for example to accommodate unusually heavy oil accumulations.

The lower edges of the skirts 30 at opposite sides of the inner V-shaped assembly 10 are interconnected by tie means such as heavy elastic shock cords 34 which, as shown in FIG. 1, extend transversely between the two legs of the assembly at spaced positions therealong, with their ends connected to bridles 35 of netting to distribute the stress along the skirts 30. This limits outward movement of the skirts 30 and prevents their trailing rearwardly due to the pressure imposed upon them by the current, and thus allowing the accumulated oily material 0 near the surface to escape beneath them. The elasticity of the shock cords 34 and of the netting bridles 35 limits the stress imposed on the skirts 30 in heavy seas.

The lower edges of the skirts 30 on the outer V-shaped assembly 12 are similarly secured to retaining means, such as the netting 36 which extends inwardly beneath the surface and it connnected to the lower flange 24 of the float members 14 of the inner assembly 10. The lower edges of the skirts 30 at each side of the outer assembly 12 adjacent its apex, and rearwardly of the apex of the inner assembly 10 are interconnected by an additional triangular section of netting 38.

The apparatus thus includes generally similar inner and outer V-shaped barriers oriented so that the wind and current will drive the oily material 0 into the open end of the inner barrier. The float members, being inflated to only a relatively low pressure, such as 0.5 p.s.i.g., are extremely flexible and can readily conform to undulations of the surface. The barriers extend above and below the surface a sufficient distance to prevent escape of the oily material 0, which is therefore funnęed inwardly and rearwardly toward the apex of the inner assembly. The two legs of each of the V-shaped assemblies are preferably arranged to subtend a relatively shallow angle at the apex, so that the wave motion is generally parallel to the legs, thus limiting the force imposed upon them and reducing the tendency of the waves to break over the top of the barriers and instead channelling the waves along the barriers to the apex. The oily material which reaches the apex of the inner assembly passes rearwardly through a large, flexible pipe 40 of reinforced neoprene or similar material which is positioned with its forward or inlet end at the apex and which trails rearwardly with its outlet end beneath a flexible triangular cover 42 which extends over the apex portion of the outer assembly 12. As best shown in FIG. 3, the outer assembly 12 may be built up in height adjacent its apex by lashing together three float members 14 in a pyramid arrangement, by lacing ropes 43 through their aligned grommets 26. The trailing edges of the cover 42 are lashed to the upper flange of the top float member 14 by ropes 45, while its leading edge is supported above the surface of the water on a series of float members 44 (FIG. 1). This insures that all of the oily material reaching the apex of the outer assembly 12 will pass beneath the leading edge of the cover 42 and be funneled into the input end of a flexible pipe 46 which extends from the apex into a floating sump 48 which trails leewardly thereof with ropes 49 interconnecting the float members 14 at the apex of the outer assembly 12 with the sump 48 to limit the stress on the pipe 46. The sump 48 is covered both top and bottom by flexible sheet material 50 and is surrounded by an inflated float ring 52 which supports it at the surface. The top and bottom covers of the sump 48 are formed with considerable fullness or excess material to permit them to bulge outwardly as oily material flows into the sump through the pipe 46. The sump 48 thus has substantial storage capacity. The oily material is removed from the sump 48 through a flexible conduit 54 which is connected to a pump on a barge (not shown). As the sump 48 is emptied, the upper and lower covers collapse together.

Due to the fact that the outer assembly 12 is in the "dead water" area to leeward of the inner assembly 10, it does an extremely efficient job of capturing any oily material which escapes from the inner assembly in heavy seas or extreme turbulence. A spacing of approximately 5 to 25 feet between the two assemblies is preferable, depending upon surface conditions.

To maintain the spacing of the two assemblies and prevent their moving too close together and acting effectively as only a single barrier, a series of lightweight but relatively rigid tubular members 56 made, for example, of stiffly flexible plastic pipe, may be connected between the inner and outer assemblies at various oblique angles. As shown in FIG. 2, the ends of the tubular members 56 may be lashed to the grommets 26 of the side flanges 24 of the float members 14. These spaces member 56 are used sparingly, and only if they prove necessary under the surface conditions being encountered, because it is highly desirable to preserve maximum overall flexibility in the apparatus, thus allowing it to conform readily to the constantly fluctuating surface as well as avoiding localized stresses associated with rigid members.

As will be appreciated, this entire apparatus may be quickly assembled and disassembled. The float members 14, when deflated and flattened, may be coiled on a reel, in the manner of a firehose. The skirt panels 30 and netting panels 36 and 38 may be folded flat and coiled on a roller. Thus the apparatus may be stored conveniently and transported easily to various locations, as required, and quickly assembled in situ. Alternatively, it may be fully assembled, except for the spacer members 56, at a shore installation and towed to the desired location with all four legs of the two V-shaped assemblies folded together to form a single narrow, elongated bundle, thus reducing the drag on the towing vessel and minimizing the strain on the apparatus.

The apparatus is positioned leewardly of the source of the oil. As wind conditions and current change, the assembly will "weather cock" automatically to the optimum orientation. If the wind and current shift so that the two legs of the V-shaped assemblies move too closely together or so that their open ends are no longer directed toward the oil source, the anchors or moorings 18 are shifted to restore the divergent relation of the legs and their proper orientation relative to the source. The open end of the inner V-shaped assembly provides free access by work boats for inspecting and servicing the apparatus.

We claim:

1. Apparatus for confining and removing oily material from the surface of a body of water comprising a series of inflated, flexible, tubular float members connected end to end to form two V-shaped assemblies, tie means connecting said two V-shaped assemblies to keep them aligned, one directly behind the other along the same central axis and spaced apart a distance of approximately 5 to 25 feet, anchor means secured to the divergent ends of said V-shaped assemblies to held said assemblies in position with their apices trailing leewardly thereof, whereby said oily material is driven by the wind and/or current toward said apices, skirt members depending from at least the outer one of said V-shaped assemblies and projecting below the surface of the water, retaining means secured adjacent the lower edge of said skirt members to keep them projecting generally downwardly and prevent their streaming rearwardly and thus allowing escape of said oily material beneath them, conduit means adjacent the apex of at least the outer V-shpaed assembly for removal of the accumulated oily material.

2. Apparatus as described in claim 1 in which said retaining means comprises tie members extending forwardly and inwardly beneath the water and attached to the inner one of said V-shaped assemblies.

3. Apparatus as described in claim 2 in which said tie members comprise sections of netting.

4. Apparatus as described in claim 1 which said anchor means comprises anchors resting on the bottom of said body of water and secured by lines to the divergent open ends of the inner one of said V-shaped assemblies.

5. Apparatus as described in claim 1 in which said tie means includes resilient structural members extending between said two Vlshaped assemblies at varying oblique angles to keep them normally spaced and apart the desired uniform distance.

6. Apparatus as described in claim 1 in which the outer one of said V-shaped assemblies is built up in height adjacent its apex by lashing together several of said tubular float members in a pyramid arrangement.

7. Apparatus as described in claim 6 in which a cover member of impermeable sheet material extends over the apex of the outer one of said V-shaped assemblies, with float means at the leading edge of said cover to keep it spaced above the surface.

8. Apparatus as described in claim 7 in which a flexible pipe extends from the apex of the inner one of said V-shaped assemblies leewardly to a position beneath said cover.

9. Apparatus as described in claim 1 which includes a sump trailing rearwardly of the apex of the outer one of said V-shaped assemblies and connected thereto by said conduit means.

10. Apparatus as described in claim 9 in which said sump is supported within inflated float means is enclosed by top and bottom covers of flexible sheet material which are formed with fullness whereby they bulge outwardly as oily material flows into the sump through said conduit means and collapse inwardly as oily material is removed from said sump.